United States Patent
Falleri et al.

(10) Patent No.: US 11,234,028 B2
(45) Date of Patent: Jan. 25, 2022

(54) ENRICHMENT SYSTEM OF VISUAL OR AUDIOVISUAL CONTENT PRODUCTS BY WAY OF METADATA AND RELATED ENRICHMENT METHOD

(71) Applicant: RETI TELEVISIVE ITALIANE S.P.A. IN FORMA ABBREVIATA R.T.I. S.P.A., Milan (IT)

(72) Inventors: Valentina Falleri, Milan (IT); Stefano Gnasso, Milan (IT); Federico Di Chio, Milan (IT); Cristiano Colangelo, Milan (IT); Giorgio Avezzu', Milan (IT)

(73) Assignee: RETI TELEVISIVE ITALIANE S.P.A. IN FORMA ABBREVIATA R.T.I. S.P.A., Milan (IT)

( * ) Notice: Subject to any disclaimer, the term of this patent is extended or adjusted under 35 U.S.C. 154(b) by 377 days.

(21) Appl. No.: 16/464,829

(22) PCT Filed: Dec. 14, 2017

(86) PCT No.: PCT/EP2017/082917
§ 371 (c)(1),
(2) Date: May 29, 2019

(87) PCT Pub. No.: WO2018/122004
PCT Pub. Date: Jul. 5, 2018

(65) Prior Publication Data
US 2021/0289239 A1 Sep. 16, 2021

(30) Foreign Application Priority Data
Dec. 29, 2016 (IT) .......................... 102016000131936

(51) Int. Cl.
*H04N 21/235* (2011.01)
*H04N 21/438* (2011.01)
*H04N 21/84* (2011.01)

(52) U.S. Cl.
CPC ....... *H04N 21/2353* (2013.01); *H04N 21/438* (2013.01); *H04N 21/84* (2013.01)

(58) Field of Classification Search
CPC ... H04N 21/2353; H04N 21/438; H04N 21/84
(Continued)

(56) References Cited

U.S. PATENT DOCUMENTS

2010/0083173 A1   4/2010   Germann et al.
2011/0107369 A1   5/2011   O'Brien et al.
(Continued)

FOREIGN PATENT DOCUMENTS

EP   1223737        7/2002
EP   2731347 A2     5/2014

OTHER PUBLICATIONS

International Search Report and Written Opinion for Corresponding International Application No. PCT/EP2017/082917 (11 Pages) (Mar. 12, 2018).

*Primary Examiner* — Dominic D Saltarelli
(74) *Attorney, Agent, or Firm* — Lucas & Mercanti, LLP

(57) ABSTRACT

A system arranged to enrich visual or audio-visual product types or products with metadata is provided, wherein the metadata concerning each product has a multilevel hierarchy structure having high hierarchy metadata and low hierarchy metadata, and the low hierarchy metadata is hierarchically dependent from the high hierarchy metadata. The system has a first IT or computer domain having an IT apparatus having first program modules arranged to populate a database with a set of folders having files concerning product types or products. The system has a second IT domain having user terminals connected to a geographical network, and having second program modules arranged to enrich the files con-
(Continued)

cerning the product types or products with the hierarchical metadata. A method for enriching product types or products with metadata is provided.

9 Claims, 4 Drawing Sheets

(58) Field of Classification Search
USPC .......................................................... 725/116
See application file for complete search history.

(56) References Cited

U.S. PATENT DOCUMENTS

| | | |
|---|---|---|
| 2011/0167462 A1 | 7/2011 | O'Connor et al. |
| 2012/0131624 A1 | 5/2012 | Garner et al. |
| 2017/0374392 A1* | 12/2017 | Hart .................... G06F 16/9024 |

\* cited by examiner

JUPITER ASCENDING

Content type ⊙  A - Master Data ⊙  A2 -  ⊙ B - Target  ⊙ C - Genres & Subgenres  ⊙ C2 -  ⊙
D - Mise en scène  ⊙  E -  ⊙  E2 - Places  ⊙  [E3 - Settings ⊙]  F -  ⊙  F2 -  ⊙  F3 -  ⊙
G - IAB Categories ⊙  H - Characters ⊙  H2 -  ⊙  H3 - Structural features  ⊙  H4 - Rolles  ⊙  H5 -  ⊙

SETTINGS FOR TEMATIC GENRES *

☑ Show all values

SETTINGS FOR DIEGETIC GENRES *   [ × River Boats ]
Wild West Towns
Railway
Blockhouse
Ghost town
Large rivers
Rocky Mountains

* Mandatory fields

[ Exit ]  [ Save ]     [ Next ]

FIG. 3

JUPITER ASCENDING

Content type ◉ A - Master Data ◉ A2 - ◉ B - Target ◉ C - Genres & Subgenres ◉ C2 - ◉
D - Mise en scène ◉ E - ◉ E2 - Places ◉ E3 - Settings ◉ F - ◉ F2 - ◉ F3 - ◉
G - iAB Categories ◉ [H - Characters] ◉ H2 - ◉ H3 - Structural features ◉ H4 - Roles ◉ H5 - ◉

RELATIONSHIPS AMONG CHARACTERS •○

```
⊟-☑ Protagonists vs antagonists
   ├─ Protagonists
   │     ├─☑ Alone hero
   │     ├─☐ Pair of heroes
   │     ├─☐ Group of heroes with a leader
   │     └─☐ Group of equal heroes
   ├─ Antagonists
   │     ├─☑ Other alone man
   │     ├─☐ Group of people with a leader
   │     ├─☐ Non-human creatures
   │     ├─☐ Nature/destiny/disasters
   │     └─☐ Organizations/society
   └─☐ Joint characters
⊞-☐ Characters roles to be described
      • Protagonist ◉
      • Deuteragonist ◉
      • Antagonist ◉
      • Other relevant characters ◉
```

OTHER RELEVANT CHARACTERS? * ◉ Yes ○ NO

[Exit] [Save]  [Previous] [Next]   • Mandatory fields

FIG. 4

ENRICHMENT SYSTEM OF VISUAL OR AUDIOVISUAL CONTENT PRODUCTS BY WAY OF METADATA AND RELATED ENRICHMENT METHOD

CROSS-REFERENCE TO RELATED APPLICATIONS

This application is a 371 of PCT/EP2017/082917, filed Dec. 14, 2017 which claims the benefit of Italian Patent Application No. 102016000131936, filed Dec. 29, 2016.

TECHNICAL FIELD

The present invention relates, in general, to a computer system configured to enrich visual or audiovisual content products with metadata.

In particular, the present invention relates to an enrichment system of visual or audiovisual contents by way of additional information or metadata arranged to specify their characteristics whereby the contents can be grouped and used by users of channels of a television network (TV) or of an Internet network.

BACKGROUND ART

Enrichment systems of visual or audiovisual content products by way of metadata are known, and for simplicity of description such content products or contents will be also referred to from now on as audiovisual contents.
Such systems, also named tagging systems of audiovisual content products, generally provide to enrich the audiovisual content products, whether they are films, television series, advertisements, etc., by way of a very limited number of basic information such as for example, kind, actors, title.

Enrichment or tagging by way of a very limited number of information implies, as easily understandable, the problem of a high risk of grouping audiovisual content products in substantially identical categories, even if in conflict each other.

There are also known computer systems and related methods configured to guide users of audiovisual content products to watch new contents on channels of a TV network or Internet, on the basis of information about previous choices made by such users.

For example, a system and method configured to predict the behavior of user groups, based on the respective user group profiles of TV channel users, is known, inter alia, from patent document EP1223737_A2.

The known system is configured to provide a continuous update of information about user choices so as to improve profiling of user groups and determine their preferences on the basis of the audiovisual content products previously selected.

A problem of the known system is that user preference forecasts are primarily based on the previous choices made by the users, taking into account only coarsely the metadata or content-related tags.

It can be followed that, even if starting from a thorough knowledge of previous user choices, new products proposed to users may not be consistent with the profiling as a result of a coarse consideration of the tagging of the audiovisual content products.

The Applicant, in general, has noted that the known art is not able to effectively solve the problem of anticipating usage requirements of products by users on the basis of their content because the known art is not able to accurately handle tagging of product contents and using of such tagging.

In particular, the Applicant has noted that the known art has great limits when trying to use only user profiles to propose or recommend new products such as films, TV shows, advertisements, etc. corresponding to the needs of the users because having available no efficient tagging of audiovisual contents, it is not able to accurately identify the products actually required by the users or agreeable to such users.

DISCLOSURE OF THE INVENTION

The object of the present invention is thus a system arranged to overcome the limits of the known art.

Such an object is achieved through an enrichment system of visual or audiovisual content products by way of metadata or tags as claimed.

The present invention also relates to an enrichment method or tagging method of visual or audiovisual contents by way of metadata.

The present invention moreover relates to a computer program product loadable in the memory of a computer unit and including software code portions for performing the steps of such method.

As used herein, the reference to such a computer program product is meant as equivalent to the reference to computer readable medium containing instructions for controlling a computer system so as to co-ordinate execution of the method according to the invention.

Reference to "a computer unit" or to "a computer system" is meant to highlight the possibility for the method of the invention to be carried out in a decentralized manner over a plurality of computer units.

Claims are an integral part of the teaching of the present invention.

The following summary of the invention is provided in order to provide a basic understanding of some aspects and features of the invention.

This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.

According to a feature of a preferred embodiment, the enrichment system of product types or products is configured so as to assign metadata to a given product according to a hierarchical order wherein higher hierarchy metadata, once selected by means of program stored in terminals connected to a geographical network, are arranged to selectively limit type and number of lower hierarchy metadata that can be assigned to a certain product.

According to a further feature of present invention, the program modules are configured so that the modification of an upper hierarchy metadata is arranged to automatically remove already assigned lower hierarchy metadata.

BRIEF DESCRIPTION OF DRAWINGS

These and further features and advantages of the present invention will appear more clearly from the following detailed description of a preferred embodiment, provided by way of a non-limiting example with reference to the attached drawings, in which components designated by same or similar reference numerals indicate components having same or similar functionality and construction and wherein:

FIG. 3 is a user terminal screen illustration in connection with the tagging method selected for "settings"; and FIG. 4 is a user terminal screen illustration in connection with the tagging method selected for "characters".

BEST MODE FOR CARRYING OUT THE INVENTION

Figure 1:
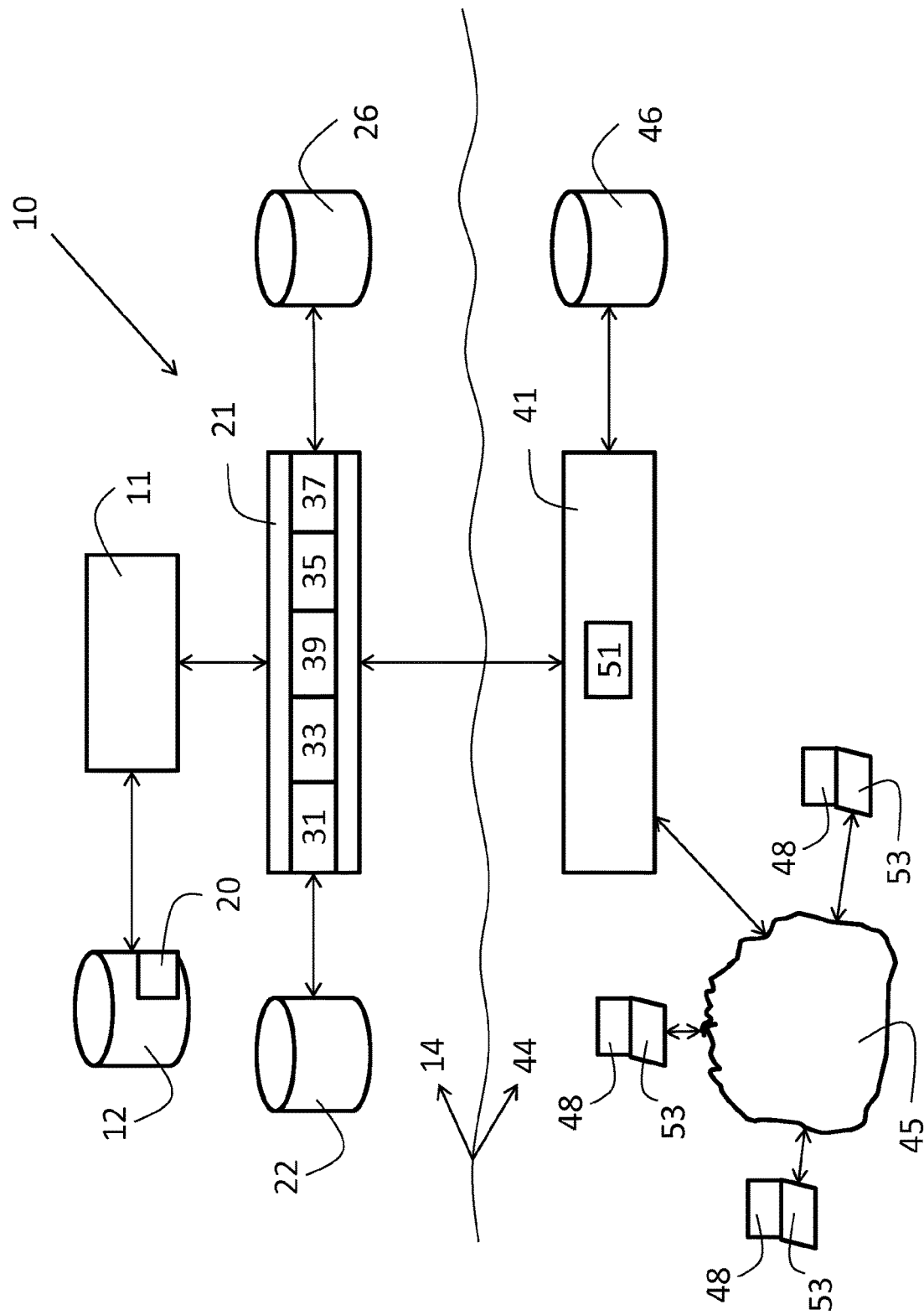
FIG. 1 shows an architectural diagram of an enrichment system of visual or audiovisual content products by way of metadata.

With reference to FIG. 1 a system 10 arranged to enrich, by way of metadata, products that comprise visual or audiovisual contents, hereinafter named audiovisual products or simply products, requires a new design of the modalities required both to attribute values (metadata or tags) to the visual or audiovisual content of the various products, and to certify them in case that metadata types and metadata are in a very large number, for example, in case that metadata types are comprised between 50 and 110 and metadata for each type are comprised, for example, between 2 and 20. Indeed, in such a context, the system must include a completely different architecture from that traditionally known wherein product distribution companies attribute an extremely limited number of metadata to products, for example less than 10 metadata per product, wherein such metadata to a great extent comprise registry metadata. As a matter of fact, in known contexts, product enrichment by way of metadata can also be done internally to companies arranged to distribute audio-visual products because metadata enrichment is essentially an automatic process or, if manual, a process that requires minimal and coarse activity.

In the context provided according to the present embodiment, however, the architecture of the system must be such as to permit to face and overcome innumerable new problems that may require not trivial or not obvious choices within a great number of possible choices.

In summary, a system 10, as described below, requires the choice of a new and not obvious architectural solution, therefore of an inventive solution among N possible but not optimal solutions, so that the system 10, built on the basis of the choice made, allows to best manage for each product, for example, 50 to 110 metadata types and 2 to 20 metadata for each metadata type.

It is also worth noting that the implementation of a new methodology of assigning metadata implies the use of new grouping tools even of different type product contents so that such contents can be easily selected by users.

In other words, it is foreseeable that a new system for assigning metadata cannot coexist with a product selection system typical of known art because of the risk of confusion between a fine way of selecting products based on a very large number of metadata, and a coarse way of selecting products based on a very limited number of metadata.

A system that meets the above requirements must, as a matter of fact, solve new issues not envisaged by the known art such as, for example:

foreseeing that all distributed products or types of products are enriched with a high number of metadata so that the selection of products or types of products allows a uniform selection method;

foreseeing, therefore, the possibility of managing a large number of products distributed by a certain company (distribution company) arranged to broadcast on television, satellite channels, etc., for example, few thousands of products to which a very large number of metadata can be associated;

foreseeing the use of equipment of the distribution company and equipment of companies and/or persons outside the distribution company responsible for assigning the metadata to the products;

providing secure ways for exchanging data and information between the distribution company and an external company and/or external persons arranged to enrich products with metadata;

providing methods for enrichment and certification of metadata assigned to the products;

providing enrichment modules configured to control the relationships among the metadata assigned to a product so that such metadata are coherent each other.

Facing and solving the above issues and others requires to provide a system arranged to enrich the products so that information or profiles of users obtained on the basis of what has been used by such users can be compared with a large number of metadata types and metadata assigned to a plurality of products, including products of a different type such as films, television series, advertisements, etc. It is, therefore, possible to suggest to the users products even of different type and comprising contents selected on the basis of a large number of metadata wherein such metadata are consistent with an equally large number of metadata associated to products or types of products used by users.

The solution to the above-cited issues and other less important issues also allows the product distribution company to refine the choice of products to be purchased on the basis of the user profiles.

In order to solve the various issues associated with the need to enrich audiovisual products with a high number of metadata, system 10, according to this exemplifying embodiment, comprises one or more devices and a plurality of program modules (first computer environment or domain) 14 comprised inside the distribution company and one or more devices and a plurality of program modules (second computer environment or domain) 44 arranged to be used by the external company and/or by external persons (taggers) for enriching the products.

In particular, according to this embodiment, it is provided that the first computer environment 14 comprises, for example in a company database 12, a list of products 20 to be enriched, and that a first apparatus 11 transmits the list or part thereof 20 to a second apparatus 21 configured to provide the received list in a second company Database 22 so that the products listed therein are arranged to be managed by the second computer environment 44.

More in particular, the second apparatus 21 comprises program modules 31 configured to populate the second company Database 22 that comprises a predetermined set of directories or folders.

For example, according to this exemplifying embodiment, in the second company Database 22 a set of folders is comprised as listed below in Table 1:

TABLE 1

FromMDS_ag
Import
Failed
Loaded
Processing
ToLoad

Wherein the folder:
.\FromMDS_tag\Import\Failed
Comprises files that have not been sent due to some problem;
The folder:
.\FromMDS_tag\ Import\ Loaded
Comprises files that have been correctly transmitted to the second computer environment 44;
The folder:
.\FromMDS_tag\Import\Processing
Comprises files whereof working-out is ongoing; and
The folder:
.\FromMDS_tag\Import\ToLoad
Comprises files that need to be worked-out by the second computer environment 44.

Obviously, according to other embodiments, the number and type of folders provided in the Database may be different from that disclosed above without departing from the scope of the invention as disclosed and claimed.

According to this embodiment, the second company Database 22 is dynamically populated by way of metadata related to products managed by program modules 31 comprised in the second apparatus 21.

Preferably the metadata, comprised in the second company Database and preferably coming from the company Database 12, comprise registry metadata as for instance identification number of each product, title and other general metadata.

According to this embodiment the second apparatus 21 preferably comprises further program modules 33, as disclosed below.

The further program modules 33 are configured to interface the first computer domain (company domain) 14 and the second computer domain (external domain) 44.

In particular, the further program modules 33 are preferably configured to populate the same set or predefined set of folders comprised in the second company Database 22 and to perform one or more of the following functions by:
  periodically verifying, for example, in the folder .\FromMDS_tag\Import\ToLoad the presence of new files to be transferred to the external domain 44;
  converting files contained in folders from a first format, such as an XML format that is compatible with the company domain 14, to a second format, such as a JSON format, which is compatible, for instance, with the external domain 44;
  storing both the files in the first format and the files in the second format different from the first one;
  invoking a secure call, such as a HTTPS call, from the company domain 14 to the external domain 44;
  verifying the correctness of the transfer by populating the folders provided in the second company Database 22 so that they are recognizable.
For example the population provides to verify that:
  in the folder .\FromMDS_tag\Import\Loaded are comprised files that has been transferred correctly; and
  in the folder .\FromMDS_tag\Import\Failed are comprised files that has been transferred incorrectly.

In particular, according to the preferred embodiment, it is provided that the external domain 44 comprises one or more apparatuses 41 comprising program modules 51 configured to allow accessing, via user terminals 48 and through a geographical network 45, such as the Internet, the files correctly received, corresponding to respective products.

More in particular, according to the preferred embodiment, it is provided that user terminals 48 comprise further program modules 53 configured to assign metadata and perform functions such as those listed below, as will be also further exemplified in detail later on:
  ensuring interactivity when uploading metadata;
  checking a correct assignment of metadata by avoiding contradictory enrichment of product contents;
  allowing a constant verification that the products have been fully enriched or are being enriched;
  performing review and authorization functions by audit users who are responsible for certifying, by way of user terminals 48, a correct tagging of the accessed or identified products.

According to the preferred embodiment the further program modules 53 are such to describe the whole product contents by using specialized metadata arranged to deeply describe narrative type, style, component values, and technical information of each product.

On the contrary to the methods applied by the known prior art, the further program modules 53 are mainly arranged to assign metadata with a very deep approach, as will be disclosed later on in detail.

Preferably, the identified products, after being enriched by metadata and certified, are stored in a database 46 of the external domain 44 by way of the user terminals 48.

According to the preferred embodiment, even in case of files relating to the identified and tagged products, it is envisaged that the transfer from the external domain 44 to the company domain 14 is carried out under the full control of program modules 35 provided for in the company domain 14.

In particular, according to this embodiment, the second apparatus 21 further comprises other program modules 35 configured to perform one or more computer processes among the following:
  Periodically invoking, for example every 2 hours, a secure call, such as an HTTPS call, from the company domain 14 to the external domain 44, and verifying the presence in the Database 46 of new files certified by audit users;
  transferring the files from the Database 46 of the external domain 44 to a third Database 26 of the company domain 14 by way of the second apparatus 21.

In particular, program modules 35 are configured to populate the third company Database 26 comprising a set or predetermined set of folders.

For example, according to the present exemplifying embodiment in the third Database 26 a set of folders as shown in Table 2 below is comprised:

TABLE 2

ToMDS_tag
  Import
    Failed
    Loaded
    Processing
    ToLoad

Wherein, similarly to what already disclosed in relation to the second Database, folder:
ToMDS_tag\Import\Failed
Comprises files whose upload operation has failed;
ToMDS\Import\Loaded
Comprises files correctly uploaded;
ToMDS\Import\Processing
Comprises files whereof working-out is ongoing; and
ToMDS\Import\ToLoad
Comprises files that need to be uploaded.

Obviously, according to other embodiments, the number and type of folders provided in the third Database may be different from that disclosed above without departing from the scope of the invention as disclosed and claimed.

According to this embodiment, the third company Database 26 is populated dynamically with the metadata of the products managed by the program modules 35 comprised in the second apparatus 21 and by further program modules 37, as described below, preferably comprised in the same apparatus.

Such further program modules 37 are configured to interface the second computer domain or external domain 44 and the first computer domain or company domain 14.

In particular, the further program modules 37 are configured to populate the same set or predetermined set of folders comprised in the third company Database 26 and to perform functions substantially reversed than those already disclosed as regards the program modules 33.

In summary, according to the preferred embodiment, the further program modules 35 and 37 preferably comprised in the second apparatus 21 allow to populate the third database 26 of the company domain 14 so that the files corresponding to the respective identified products can be fully managed within the company domain 14 after being enriched with metadata, preferably, in the external domain 44.

According to the preferred embodiment, the functions of the second apparatus 21 and of the respective program modules 31, 33, 35 and 37 are provided to completely keep independent the first domain 14 from the second domain 44 and to ensure a very high level of security of the system 10 as a whole.

As a matter of fact, the management of the system 10 is always controlled by the first domain 14, which is the only one enabled to activate the transmission to the second domain 44 or the upload of data and information from the second domain 44.

The system 10 according to the present exemplifying embodiment is preferably configured so that the second apparatus 21 also comprises program modules 39 arranged to periodically check for the presence of new files in the third Database 26 and to transfer, in affirmative case, the new files to the first apparatus 11 so that such files can be stored in the company Database 12 and recognized as files enriched with metadata and ready to be managed by taking into account, for instance, the user profiles.

The architecture of the system 10 above disclosed has been detailed by suggesting that a plurality of devices 11 and 21 are comprised in the company domain 14 and that a plurality of devices 41, 48 are comprised in the external domain 44.

Obviously, as easily understandable by a technician in the field, it is foreseeable that the two domains are a single domain and that the various program modules are properly arranged in a single apparatus, without departing from the scope of the invention as disclosed and claimed.

In summary, architectural choices related to the system 10 have involved the implementation, preferably, of two domains, 14 and 44, completely independent each other and communicating only so that only one of the two domains, preferably the company domain 14, is arranged to control the exchange of information between the company domain 14 and external domain 44.

As broadly anticipated in this disclosure, the system 10 as a whole comprises an architecture that is based on the fact that the number of metadata types or the metadata grid and the number of metadata for each type is extremely high.

As a non-exhaustive example, some of the most significant metadata types provided for tagging audiovisual contents are listed herein-below. However, according to the Applicant's experience, it is appropriate to specify that the metadata types and the metadata associated to the various types, in case, for example, of products such as Films, Television Series, Entertainment Programs, Information and News Programs, or Advertisements may preferably be different from each other.

For example, in case of Films, the metadata grid may comprise at least:

Master data, Target, Genres and Subgenres, Mise en Scene, Places, IAB Categories, Characters;

and may not comprise:

Episodes.

In case of television series, for example, the metadata grid may be similar or the same as that of the Films, except that it also includes a type called Episodes.

Moreover, in case of television series, it is also preferable that the types of metadata relating to the television series comprise at least one hierarchical structure that identifies both the series as a whole (super-series) and the singles episodes of the television series (season).

In case of entertainment programs, for example, the metadata grid may comprise at least:

Master data, Target, Themes, Mise en Scene, IAB Categories, Episodes;

and may comprise, preferably, a hierarchical structure that identifies both the Entertainment Program as a whole (super-series), as well as the individual episode of the Entertainment Program (season).

According to the preferred embodiment, it is provided that each type of metadata may comprise a respective tree structure and that constraints are provided for assigning metadata.

For example constraints can be of the type that:

Metadata must be assigned following a predetermined sequence;

Metadata or fields may be compulsory or optional;

Metadata or fields comprise qualitative values and/or numeric values. For example, in case of Films, as regards the type of metadata "Target", metadata are provided related to "Socio-demo categories" comprising qualitative values, as for instance:

FAMILY (children+adults),

FEMALE,

MALE,

TEENS (13-19),

YOUNG-ADULTS (20-40),

ADULTS (40-plus), etc., and metadata related to "strong, disturbing images" comprising quantitative values:

1=STRICT EUPHEMISM,

2=ONLY SOME STRONG IMAGE,

3=ONLY SOME EXPLICIT/DISTURBING IMAGE,

4=WITH EXPLICIT/GORY IMAGES,

5=WITH A LARGE NUMBER OF EXPLICIT/GORY IMAGES.

metadata or fields are included within a minimum or maximum number of possible assignments;

certain metadata or fields are influenced by the presence of other metadata types or metadata, so as to ensure a metadata coherence control among metadata at the same hierarchy level and metadata at different hierarchy level.

In addition to the various tree structures and to the exemplified constraints, it is also preferably provided that any modification of a metadata may result in the deletion of metadata previously assigned by the tagger. For example, if the tagger discovers, before declaring to have completed metadata assignation, that, for instance, in the type of metadata "Genres and subgenres" concerning a film it would be more appropriate to select a genre other than the one previously assigned, preferably it is provided that the selection of a different genre automatically causes the deletion of metadata successively assigned and hierarchically dependent on the genre previously assigned.

The management of metadata types, metadata and constraints as provided according to the present exemplifying embodiment has been obtained through the implementation of specific program modules and of a consequent processing methodology on the user terminals 48 available to the taggers.

The choice about the structure of metadata grid and the constraints among grid elements has led to the implementation of programs on user terminals 48 comprising variable characteristics depending on the type of audiovisual product and on the type of metadata to be handled.

This choice is not trivial nor obvious as it involves the implementation of a number of extremely heavy controls wherein, for example, a control methodology is expected to handle a grid of about 100 metadata types as regards products as Films, TV Series, Entertainment Programs, respectively, and a total of metadata of about 2000 metadata that can be theoretically associated to each grid, but where only about 200 metadata can be assigned to the same product.

The benefits of managing such complexity lie in the ability to assign an extremely high number of metadata to each product so ad to allow:

(a) Improving any product suggestion engine on the basis of usage profiles of products effected by individual users;

b) Creating editorial collections based on sets of metadata grids that are similar each other but that are not recognizable before tagging;

c) Suggesting to the distribution company to produce new types of products or editorial contents, comprising metadata types and metadata mainly requested by users.

In summary, the program modules 53 and the resulting methodology implemented in user terminals 48 allow to handle a valuable intellectual work of assigning metadata by way of technical means, however, such technical means require to be very complex due to the complexity of the required intellectual work, contrary to the usual practice in the field of tagging audiovisual contents with computer program products.

An example of a general block diagram representative of the tagging method implemented on user terminals 48 is given below.

Figure 2:
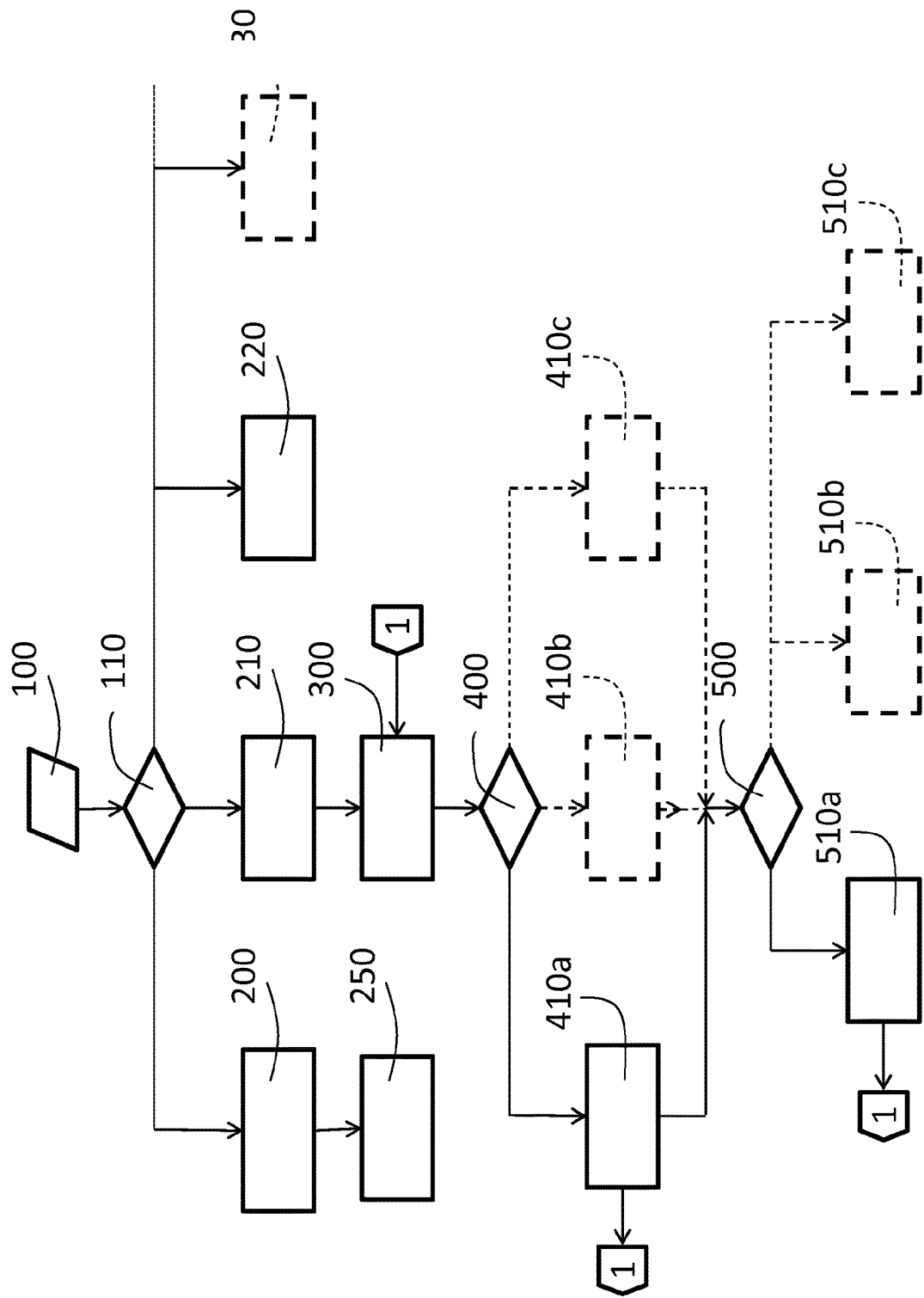
FIG. 2 shows a general block diagram of a tagging method provided in the system.

The block diagram represented in FIG. 2 is intended to be an example of a general, synthetic but not exhaustive diagram of a tagging method.

In a first block 100, each product is expected to be distinguished by type.

This block (block 100) allows to select (block 110) among different product types if the product is, for example:
    a television series (super-series) (block 200) and, hierarchically, its season (block 250),
    a film (block 210),
    an entertainment program (block 220), or
    an advertisement type (block 230),
etc.

Assuming, for simplicity of description, that the product is a certain film, the tagging method implemented in user terminals 48 provides that a diegetic genre be assigned to the film such to specify a narrative context or diegetic genre (block 300).

The implemented method at this point opens a limited number of possible tags, preferably mandatory, comprising, for example, "Settings" tags (400, 410a), "characters" tags (500, 510a), etc.

According to the example block 400 is indicative of a "Settings" selection in case of a certain narrative context and block 500 is indicative of "Characters" selection in case of a certain narrative context. An example of the limited number of possible tags provided for "Settings" and "Characters" in case of a narrative context "Western" is reported, for example, in FIG. 3 and FIG. 4.

According to the preferred embodiment of the invention, if the tagger detects, after continuing in blocks 410a, 510a that the diegetic genre assigned, such as the "Western" type, is not appropriate and that a different genre should more appropriate, it is provided that the tagger can change the diegetic genre (back reference block 1) by going back to block 300 so that the tagger can use blocks that comprise alternative tags, such as blocks 410b, 410c, and then further alternative blocks 510b, 510c. In the above case, according to the preferred embodiment, it is expected that the tagging method implemented in the user terminals 48 provides to cancel all the tags already selected among the limited number of possible tags related to the "Western" genre so that new tags, such as those inserted in blocks 410a, 510a must be reinserted by using "Settings" that comprise alternative tags.

For instance, if the tagger decides to change the diegetic genre from "Western" to "Fantasy", this action is arranged to delete all previously "Settings" selected and associated to the "Western" genre. New "Settings" should be suggested to the tagger comprising, for example, "Castle", "Enchanted Gardens" and "Far Worlds" tags. The same deletion will be applied to "Characters" if already assigned.

In summary, such control methodology is also provided in subsequent steps of the tagging method 53 implemented in user terminals 48, when a certain choice, provided in the process earlier than other choices, is changed.

According to the preferred embodiment, the tagging method 53 implemented in the user terminals 48 is expected to be subject to certification by supervisors and that, following approval of the tagging, the content of the tagging relating to certain products is transferred, by means of the network 45, to the Database 46 in order to be subsequently processed as above disclosed with reference to the System 10 as a whole.

In order to better clarify the block diagram above exemplified, the content of FIG. 3 and FIG. 4 is explained below.

In particular, with reference to FIG. 3, the tagging method allows to make dependent the choice of some tags from other previously selected tags.

This is a consistency check that greatly reduces the chances of human error and thus allows for a homogeneous and normalized tagging.

In the case of a Western film, the tagging method proposes, through a pop-up menu, a limited set of "Settings" such as the "Wild West Towns", "Railway", "Blockhouse", "Ghost town" and so on. The same process applies to other types of tags as shown in FIG. 3.

More in particular, with reference to FIG. 4, for example, the tagging method is exemplified with reference to the definition of the characteristics of the characters and the relations among characters in case of Western-style diegetic products. For example, the tagger may establish the relationship between characters such as: there is an opposition between two characters, i.e. there is a contrast between a protagonist and an antagonist? And if yes, is there a helper? Or do all the characters have the same relevance?

Based on these tagging, the number of character cards to be assigned or compiled is differentiated (e.g. three different tags are assigned if they are a protagonist, an antagonist, and a deuteragonist), and a variable tag set for each assigned tag is compiled.

Preferably, following the tags assigned to "Characters", for each of the characters the tagger is asked, for example, to indicate the species (e.g. human, animal, anthropomorphic object, supernatural creature . . . ). With regard to this latter choice, the number of attributes that the tagger can assign may be differentiated.

In particular, if the "Character" protagonist is an animal, all tags that outline the personality of the "Character" (psychological complexity, appeal, community esteem, identity elements, and so on) will not be presented to the tagger.

As already mentioned, if the tagger changes the relationship between the characters, for example from "Hero only against another man" (which implies the presence of a protagonist and an antagonist) to "Equality Characters" (which, for example, only opens the tab "Others relevant characters"), the tags of all the subsequent steps, possibly already assigned by the tagger, are deleted because the enrichment of some contents is subordinate to the relation among the characters: i.e. by modifying the relation, as mentioned above, some tags are removed, if they are of lower hierarchy, and may no longer be shown to the tagger, or, alternatively, different tags can be shown to the tagger even being equal the tags of upper hierarchy.

From the above, it is clear that the implemented tagging method allows to differentiate the tags, being equal the product type, on the basis of parameters such as gender or other parameters, considered more hierarchically relevant than others.

As clearly understandable, the way in which a film can be described or enriched is significantly different from the way in which a TV series or newsletter or, even, an entertainment program (variety) or advertisement can be described.

However, contact points exist among these different product types, such as the cast, the target to which the work is directed (children, young adults, etc.), the type of narrative, the topics discussed, and so on.

It follows that, being the tagging environment only one, it is possible to identify whether certain tags or specific sub-tags of a certain tag are attributable to one or more product types.

In summary, Applicant has noted that the contact points, if identified among different product types, work as a maximum common divisor and their main function is to allow an improvement of orientation or "recommendation" systems because the recommendation may not be only based on similar product types, but may be based on completely different types of products that, unexpectedly, may, however, be recommended to and appreciated by end users.

The operation of the system 10 as described above is the following.

As a first step, the first equipment 11, for example a company server arranged to distribute audiovisual products to be used by users, submits a list of contents to be enriched with metadata to the second device 21, for example to a file exchange server internal to the company, which, for example, provides the new contents to be enriched completed with their identifiers in the folders exemplified in Table 1 of the Database 22 by means of the program modules 31.

At the same time, the program modules 33 periodically poll the database 22 to check if there are therein new content folders or files to be enriched.

In case of new folders or files to be enriched the program modules 33 provide to:
load the new files to be enriched,
convert the files from the first format to the second format,
make a call to the apparatus 41 of the external domain 44, for example to a third-party server,
transfer the new files to be enriched to the apparatus 41 of the external domain 44.

After completing the above steps, taggers can enrich contents with metadata by using the program modules 53 provided in the user terminals 48.

Enrichment comprises at least the following steps:
real enrichment with metadata;
certification that file enrichment has been made and is correct,
storing in the Database 46 the files corresponding to the audiovisual content products by using the second format or format provided in the external domain.

The presence in the Database 46 of the enriched files is periodically verified by the program modules 35 provided in the second apparatus 21, which provides, in affirmative case, and in cooperation with the further program modules 37 to:
upload files from external domain 44,
convert files from the second format to the first format,
store the converted files in database 26 of the file exchange server 21, for example in the folders exemplified in Table 2.

Periodically, the file exchange server 21 internal to the company checks, for example, by way of the program modules 39, the presence of new files in Database 26 and, in affirmative case, uploads the enriched and certified files on the company Database 12 of the company server arranged to distribute the audiovisual content products.

Advantageously, the system 10 as disclosed, through the enrichment of audiovisual content products with a large number of metadata types and metadata, allows to obtain a large number of information about the preferences of the consumer users by using their respective user profiles.

Moreover, the enrichment of audiovisual content products makes it possible to obtain further significant benefits.

As a matter of fact, the intensive product enrichment can be used to:
directing the user of audiovisual contents to select contents comprising more targeted and better choices even among different types of products, such as films, TV series, TV shows, advertisements, etc.

In addition, the enrichment of audiovisual content can also be advantageously used to:
support programming of audiovisual content products, thanks to the greater number of information available for each product,
support and/or drive content rights acquisition by identifying those contents that users to a greater extent enjoy.

Of course, obvious changes and/or variations to the above disclosure are possible, as regards components, and connections, as well as details of the described construction and operation method without departing from the scope of the invention as defined by the claims that follow.

The invention claimed is:

1. A system arranged to enrich visual or audio-visual product types or products with metadata by way of computer program modules,
comprising,
a first IT or computer domain comprising an IT apparatus comprising first program modules arranged to populate a database with a set of directories comprising files concerning product types or products,
a second IT domain comprising user terminals connected to a geographical network, and comprising second program modules arranged to enrich said files concerning said product types or products with metadata,
the first IT domain further comprising further program modules arranged to
convert said files from a first format to a second format incompatible with the first format and to transfer the converted files from the first IT domain to the second IT domain;
Wherein
the metadata concerning each product comprise a multilevel hierarchy structure comprising high hierarchy metadata and low hierarchy metadata, said low hierarchy metadata being lower than the high hierarchy metadata, dependent from the high hierarchy metadata and selectable among a limited number of metadata selectively provided by said high hierarchy metadata by way of said second program modules, and
said further program modules of said first IT domain comprise program modules arranged to
transfer under the control of said first IT domain the converted files enriched with said metadata from the second IT domain to the first IT domain and to convert said enriched converted files from the second format to the first format, whereby the first IT domain is completely independent from the second IT domain;
wherein said second program modules in said user terminals are adapted to:
automatically cancel the low hierarchy metadata provided by said high hierarchy metadata in case of change of said high hierarchy metadata, and provide as a function of the modified high hierarchy metadata new types of ranges of low hierarchy metadata.

2. The system according to claim 1, wherein in said IT apparatus of said first IT domain said further program modules are also arranged to verify presence of said enriched files and to transfer said enriched files to a further IT apparatus comprised in said first IT domain.

3. The system according to claim 1, wherein said second program modules comprised in said user terminals are arranged to:
ensure inside said multilevel hierarchy structure a metadata coherence control among metadata at the same hierarchy level and metadata at different hierarchy level.

4. The system according to claim 1, wherein said visual or audio-visual product types or products are selected from the group consisting of:
film,
TV series,
entertainment programs,
information programs and news, and
advertising.

5. A method for enriching visual or audio-visual product types or products with metadata,
said method comprising the steps of:
populating by way of first program modules comprised in a first domain at least one database with a set of directories comprising files concerning the product types or products to be enriched or already enriched with metadata,
transferring by way of said first program modules comprised in the first domain the files concerning the product types or products to be enriched to a plurality of user terminals connected by way of a geographical network to an IT apparatus comprised in a second domain,
enriching in said second domain, by way of second program modules implemented in said terminals of said plurality, said files concerning said product types or products so as to obtain enriched files, and
wherein said enriching step comprises the steps of:
selectively providing metadata to a certain product, the metadata concerning each product comprising a multilevel hierarchy structure comprising high hierarchy metadata and low hierarchy metadata, said low hierarchy metadata being lower than the high hierarchy metadata, dependent from the high hierarchy metadata and selectable by way of said second program modules among a limited number of metadata selectively provided by said high hierarchy metadata according to said multilevel hierarchy structure;
providing for modifying high hierarchy metadata by way of said second program modules,
automatically cancelling by way of said second program modules metadata already selected of a low hierarchy dependent from the high hierarchy metadata as a function of the modification made to the high hierarchy metadata, and
providing as a function of the modified high hierarchy metadata new types and ranges of low hierarchy metadata.

6. The method according to claim 5, wherein
said step of populating the database is performed inside a first IT domain, and further comprises
an automatic conversion step of said files from a first format, compatible with the first IT domain, to a second format, different from the first format and compatible with said second IT domain and vice-versa.

7. The method according to claim 5, wherein said database populating step further comprises by way of said first program modules of said first domain
a transferring step for transferring said converted files from said first IT domain to said second IT domain, and
a transferring step for transferring said enriched converted files from said second IT domain to said first domain.

8. The method according to claim 5 wherein said second program modules comprised in said user terminals are arranged to:
- ensure inside said multilevel hierarchy structure a metadata coherence control among metadata at the same hierarchy level and metadata at different hierarchy level.

9. The method according to claim 5, wherein said step of enriching said files concerning said product types or products comprises the steps of enriching product types or products are selected from the group consisting of:
- film,
- TV series,
- entertainment programs,
- information programs and news, and
- advertising.

* * * * *